United States Patent

Berbec et al.

[11] Patent Number: 6,122,631
[45] Date of Patent: Sep. 19, 2000

[54] DYNAMIC SERVER-MANAGED ACCESS CONTROL FOR A DISTRIBUTED FILE SYSTEM

[75] Inventors: Robert R. Berbec, New York, N.Y.; John L. Brady, Apex, N.C.; James M. Caffrey, Woodstock, N.Y.; Joanne T. Crimi, Highland, N.Y.; Arthur P. Fenaroli, Rhinebeck, N.Y.; Matthew C. Iatridis, Woodstock, N.Y.; Gary S. Puchkoff; Roberto J. Sanchez, both of Poughkeepsie, N.Y.; Madeline R. Whalen, Hyde Park, N.Y.; Joseph A. Williams, Cary, N.C.

[73] Assignee: International Business Machines Corporation, Armonk, N.Y.

[21] Appl. No.: 08/825,303

[22] Filed: Mar. 28, 1997

[51] Int. Cl.$^7$ .................................... G06F 13/14
[52] U.S. Cl. .............................. 707/9; 380/25
[58] Field of Search ................ 707/200, 8, 201, 707/203, 10, 103, 9; 380/25

[56] References Cited

U.S. PATENT DOCUMENTS

| | | |
|---|---|---|
| 4,919,545 | 4/1990 | Yu . |
| 5,173,939 | 12/1992 | Abadi et al. . |
| 5,187,790 | 2/1993 | East et al. . |
| 5,220,603 | 6/1993 | Parker . |
| 5,226,079 | 7/1993 | Holloway ................................. 380/25 |
| 5,235,642 | 8/1993 | Wobber et al. . |
| 5,263,157 | 11/1993 | Janis . |
| 5,263,158 | 11/1993 | Janis . |
| 5,263,165 | 11/1993 | Janis . |
| 5,339,403 | 8/1994 | Parker . |
| 5,455,953 | 10/1995 | Russell ................................... 710/266 |
| 5,481,720 | 1/1996 | Loucks et al. ........................... 713/201 |
| 5,506,961 | 4/1996 | Carlson et al. .......................... 713/200 |
| 5,542,046 | 7/1996 | Carlson et al. .......................... 395/186 |
| 5,560,008 | 9/1996 | Johnson et al. ......................... 709/300 |
| 5,586,260 | 12/1996 | Hu . |
| 5,592,553 | 1/1997 | Guski et al. . |
| 5,649,105 | 7/1997 | Aldred et al. ...................... 395/200.04 |
| 5,649,185 | 7/1997 | Antognini et al. ...................... 395/609 |
| 5,742,812 | 4/1998 | Baylor et al. ........................... 395/608 |
| 5,802,062 | 9/1998 | Gehani et al. .......................... 370/465 |
| 5,812,666 | 9/1998 | Baker et al. .............................. 380/21 |
| 5,815,574 | 9/1998 | Fortinsky ................................. 380/25 |
| 5,841,871 | 11/1998 | Pinkas ..................................... 380/25 |

FOREIGN PATENT DOCUMENTS 0 720 091 A2   7/1996   European Pat. Off. .

OTHER PUBLICATIONS

"Kerberos: An Authentication Service for Open Network Systems" by J.G. Steiner et al., USENIX Winter Conference, Feb. 9–12, 1988, Dallas, TX, pp. 191–202.

"Secure Distributed Computing" by J.I. Schiller, Scientific American, Nov. 1994, pp. 72–76.

"UNIX Network Programming" by W. Richard Stevens, 1990 by PTR Prentice–Hall, Inc., ISBN 0–13–949876–1, pp. 431–436.

Primary Examiner—Paul V. Kulik
Attorney, Agent, or Firm—William A. Kinnaman, Jr.

[57] ABSTRACT

A method and apparatus for providing dynamically controlling access to files in a client/server system. A client wanting access to a file first requests a token from an object server. The object server generates the token as a function of the file name and ephemeral information and provides the token to both the client and the file system. Upon receiving the token from the object server, the client presents an access request to the file system, using the token rather than the file name as an identifier. The file system compares the received identifier with the file names in the specified directory as well as with a list of valid tokens that it maintains. If the identifier corresponds to a valid token for a file in the directory, the access request is granted. Otherwise, the access request is denied. The procedure is transparent to the client, which uses the token in the same manner as it would use a regular file name.

13 Claims, 6 Drawing Sheets

DYNAMIC SERVER-MANAGED ACCESS CONTROL FOR A DISTRIBUTED FILE SYSTEM

BACKGROUND OF THE INVENTION

1. Field of the Invention

This invention relates to a method and apparatus for controlling access to data objects and, more particularly, to a method and apparatus for allowing a server to dynamically manage access control for a distributed file system.

2. Description of the Related Art

Client/server systems, in which client processes issue requests to server processes (usually on separate machines) to perform specified services for the client processes are well known in the art. File servers, which manage files accessed by remote clients, form an important class of servers; distributed file systems are made up of one or more such file servers that appear to a client as a single entity. For large objects such as multimedia, a distributed file system requires fewer resources and provides faster startup times than the traditional server model in which the entire object is shipped to the client, who places the object into a local cache.

Often in client/server systems there are ancillary servers as well that assist clients in accessing files. Such ancillary servers include security servers such as the ticket-granting server in the Kerberos security system. Another example of an ancillary server of this type is the object server used in the IBM Digital Library in conjunction with the distributed file system that manages the digital objects being accessed.

It is highly desirable that servers such as the ancillary servers described above be able to dynamically control who has access to information stored in a file system. Thus, servers that support products such as the IBM Digital Library or FlowMark® are process sensitive or have a customer charging mechanism as part of the application. Such servers should to be able to dynamically determine which user can access which object.

In addition, a client should be able to access both protected objects and unprotected objects without having to care whether or not the information is protected. That is, the client should be able to use the same access methods for either case.

SUMMARY OF THE INVENTION

The present invention contemplates a dynamic server-managed access control system for providing the necessary access control. In accordance with the invention, an object server creates a server file access token (hereinafter simply "token") which it delivers to the distributed file system and to the client. The client uses the token in place of a standard file name. If a request to access (open) the file is received from a client with the token, the file is opened. If a request to access the file is received without a token or with a bad token, the file is not opened and the client receives a "file not found" indication. Using this support, a token, provides dynamic object or file-level access control. The dynamic server-managed access control of the present invention thus allows a server to use the distributed file system to deliver the data in a secure fashion.

DESCRIPTION OF THE PREFERRED EMBODIMENT

System Overview

Figure 1:
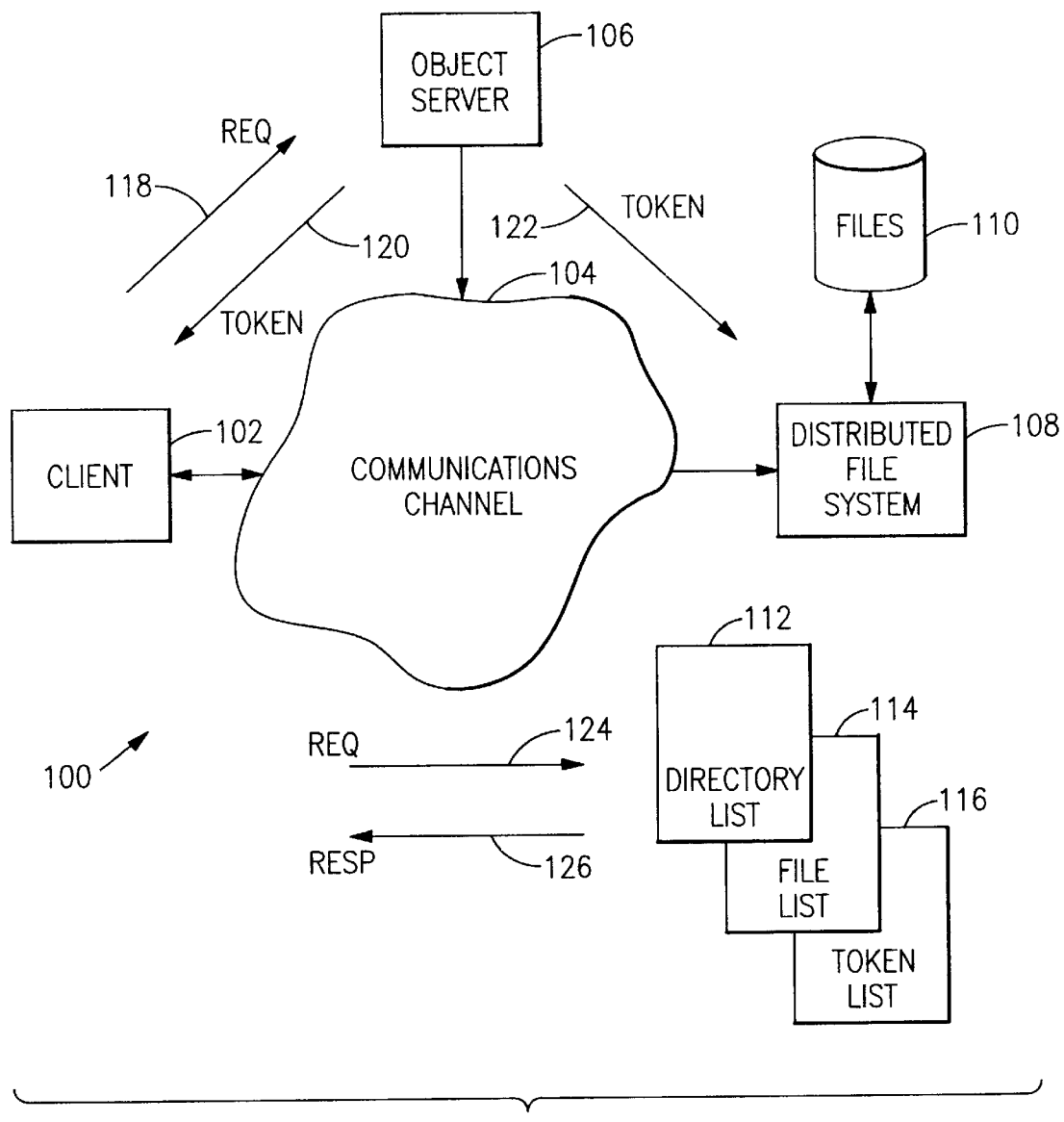
FIG. 1 is a schematic block diagram of a client/server system incorporating the present invention.

FIG. 1 shows a client/server system 100 in which the access control system of the present invention may be used. System 100 contains at least one workstation client 102, an object server 106, and a distributed file system 108, all of which intercommunicate via a communications channel shown generically at 104. File system 108 manages a set of files 110 being accessed that are kept on a suitable storage device such as a direct access storage device (DASD). File system 108 responds to standard file access requests (such as "open") with either a file handle or descriptor (a small integer identifying the file for the requesting process) or an error code indicating why the operation was unsuccessful, such as that the file cannot be found or that it cannot be accessed. Server 106, which is a trusted server, "owns " the files 110 and is used to grant the file access tokens of the present invention.

In the particular example shown in FIG. 1, system 100 may comprise an instance of the IBM Digital Library in which server 106 functions as an object server. File system 108 may comprise the IBM® OS/390™ LAN Server (formerly LAN Server for MVS®), a component of the OS/390 operating system executing on an IBM System/390® (S/390®) processor. File system 108 may reside on the same machine as server 106 or on a different machine, depending on the particular implementation.

File system 108 is a hierarchical file system in which files are maintained in directories, which may be subdirectories of other directories. Thus, a complete specification of a file may have the form:

Diskname:\Pathname\filename.typ where Diskname (usually a letter) is the name of the logical disk drive on which the file is located; Pathname specifies the directories, if any, from most inclusive to least inclusive directory; filename is the file name proper; and typ is the file type or extension, which usually indicates some generic category of file. File system 108 maintains several data structures to enable it to manage files 110, including a directory list 112 and, for each directory, a file list 114, as is well known in the art. In accordance with the present invention, file system 108 also maintains for each directory a token list 116 listing the tokens created for files 110 in that directory.

Files 110 may be either protected or unprotected. Unprotected files 110 are accessed by clients 102 under their normal file names. Protected files 110, however, must be accessed using tokens, as described below.

As noted above, server 106 uses tokens to provide controlled access to protected objects 110 managed by the file system 108. The procedure of the present invention comprises four general stages: file creation, token creation, token usage, and token destruction.

In the file creation stage, files 110 that are to be protected are given one or more attributes (e.g., "hidden") that indicate to the file system 108 that they are protected files for which a token rather than a file name is required as a file identifier.

In the token creation stage, server 106 grants dynamic access to a protected file 110 in response to a request 118 from a client 102 by generating a token 120 for that file, which is returned to the client. Server 106 also provides a copy 122 of the token to the file system 108, which adds the token to its token list 116. The token-granting procedure is transparent to the client 102, which assumes it is receiving a file name as an identifier (as occurs conventionally) and uses the token 120 in the same manner as it would a normal file name.

In the token usage stage, the client 102 sends a request 124 to the file system 108 in which it requests access to a file 110 using a standard file operation (e.g., open), except that it provides the file system 108 with a token instead of a file name. (Because of the transparency of the procedure to the client, the client 102 is unaware of whether the identifier it presents is a token or an original file name.) The file system 108 then issues a response 126 to the client 102 that depends on the result of the operation. If an acceptable token 120 is provided, then the file system 108 allows the file 110 corresponding to the token to be opened. If the token 120 is bad, then the file system 108 rejects the request and does not open the file 110.

In the token destruction stage, a token 120 is deleted from the token list 116 so that it can no longer be used to access a file 110. Server 106 can determine how the token 120 can be invalidated. Depending upon the decision of the server 106 and the policy set for the file system 108, the token 120 may be invalidated either after it is used or after a set period of time has elapsed. Thus, the file system 108 can invalidate the token 120 because it is too old; the length of time can be set either for all objects 110 as a matter of policy by the file system 108 or for a particular object when the token is created. Alternatively, server 106 can invalidate the dynamic access to the file 110 when the client 102 is finished with the file by deleting the token 120.

These four stages, discussed in outline above, are discussed in more detail below.

File Creation

When a protected file 110 is created, server 106 makes the file private using standard file system functions to indicate its protected status to the file system 108. For example, in the IBM Digital Library, server 106 may use an OS/390 LAN Server application programming interface (API) to issue the OS/390 LAN Server command SET ATTRIB:

1. for local area network (LAN) access (e.g., via a server message block (SMB)) by marking the file 110 with the extended attribute of hidden.
2. for NFS access by setting xperm to rwx---, xuid to the user ID (uid) of server 106 (i.e., of the particular address space implementing the server function), and xgid to the group ID (gid) of the server address space. As is standard in UNIX® systems, these permission bits indicate to the file system 108 that the server 106, as owner of the file 110, has read, write and execute permission, but no one else, including others in the owner's group, has any access rights at all to the file.

Other means for marking a file 110 as a protected file could be used instead, so long as they are not easily subverted by malicious users.

Token Creation

Figure 2:
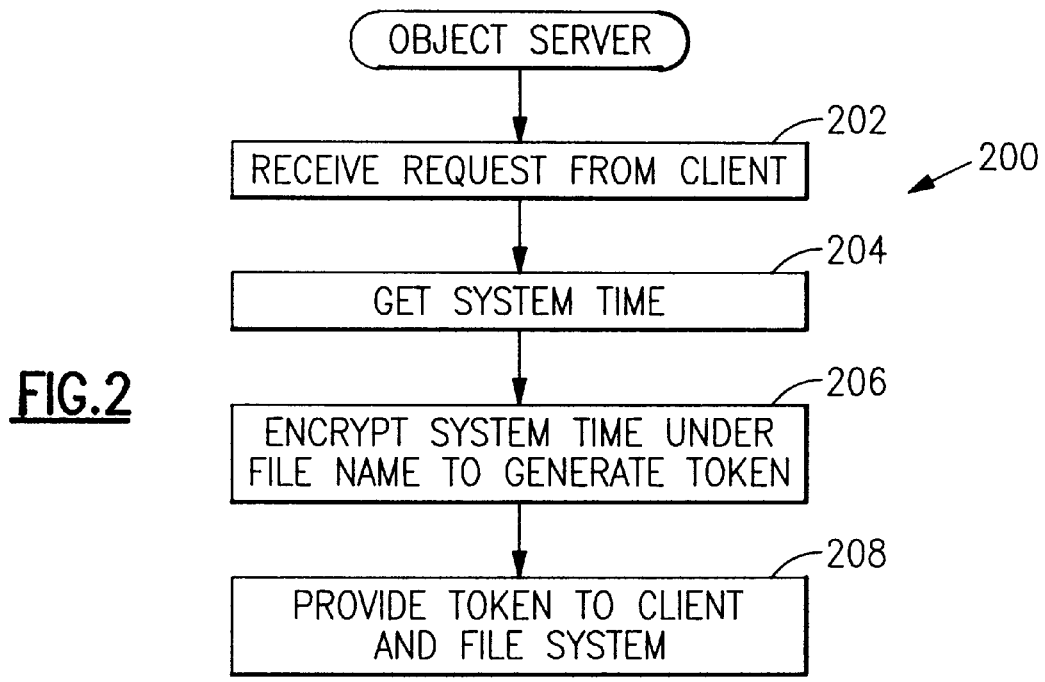
FIG. 2 is a flowchart of the token generation procedure followed by the LAN server shown in FIG. 1.

FIG. 2 shows the general procedure 200 for granting a token 120 to a client 102 seeking to access a file 110 stored in the file system 108. The procedure begins with a request 118 to the server 106 from the workstation client 102 (step 202). At this point, the server 106 has the file name, and the client 102 does not have the file name but expects to receive it in response to its request 118 to the server.

Figure 3:
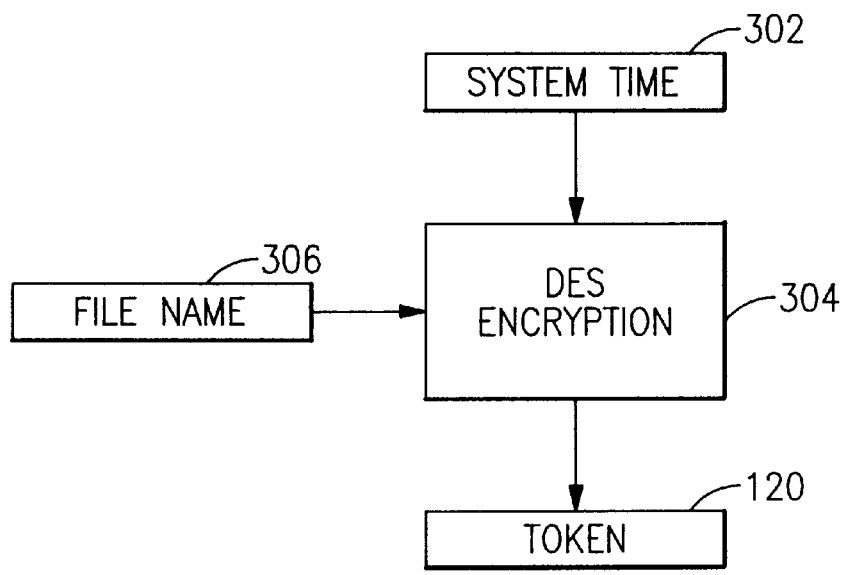
FIG. 3 is a schematic block diagram of the encryption procedure for generating a token.

Upon receiving the request 118 from the client 102, the server 106 generates a token 120 as a function of the file name and an ephemeral value such as time. By using ephemeral information in this manner, the server 106 ensures that the token 120 is not easily forged. More particularly, and referring also to FIG. 3, server 106 gets the current system time 302 (representing the time that the server 106 received the request 118 for the file 110), padding or truncating the system time as needed to create a 64-bit string (step 204). Preferably, time value 302 should have a granularity of about one millisecond in the least significant bit position.

Server 106 then uses a standard symmetrical encryption function such as a DES function 304 to encrypt the system time 302, using the file name 306 (a 64-bit string) as an encryption key, to generate a 64-bit token 120 as an output of the encryption function (step 206).

Finally, server 106 provides the token 120 together with other data items to the client 102 and the file system 108 (step 208). Thus, server 106 delivers the following data items to file system 108:

1. resource name (disk name or NFS mount point).
2. standard path name.
3. token in place of file name.
4. standard type (i.e., file extension).
5. length of time to allow token to be valid (optional, depends upon policy of file system or server).

The resource name, path name and standard type are also returned to the client 102 along with the token 120. In addition, server 108 provides file system 108 with the file name from which the token 120 was generated, since this is used to transform the token back into a file name 306 and possibly to regenerate the time 302, as described below.

Any suitable mechanism may be used to provide the token and other file information to the file system 108. Thus, for the IBM Digital Library, server 106 may use an OS/390 LAN Server API to issue an OS/390 LAN Server command SET ATTRIB.

Preferably, communications channel 104 should permit secure transmission of these values to both the client 102 and the file system 108 without alteration of their contents or interception by unauthorized parties. The particular means for effecting such secure transmission form no part of the present invention.

As noted above, the token 120 which server 106 delivers to the file system 108 and to the client 102 looks to the client like an ordinary file name. Thus, when the client 102 subsequently attempts to open the file:

Diskname:\Pathname\filename.typ
it assumes it is opening (and passes the parameters for) the nonexistent file:

Diskname:\Pathname\token.typ
where token is an 8-character string.

To accommodate the present invention, an existing system in which server 106 provides a client 102 with a file name in response to a given command would be modified to provide the client with a token instead of a file name. For example, the IBM Digital Library would be modified so that the client commands LibRetrieveItemPart, LibRetrievebyLabel, and LibRetrievebyName would cause the server 106 to generate a token 120 for use by the file system 108. Since the Digital Library client 102 uses the file system 108 as a remote cache, the token 120 would not be invalidated after a predetermined period of time.

Token Destruction

The present invention contemplates that a token 120 may be destroyed by a request from server 106 to the file system 108. This will cause the token 120 to be removed from the token list 116. This may be implemented in any suitable manner. For example, in the IBM Digital Library, the client service LibFreeItemPart, which deletes an item from the library client cache, may be used to cause the server 106 to request that file system 108 delete the token from its list.

If the server 106 wants the token 120 to have a defined life, it delivers the token and possibly the length of time to allow the token to be valid to the file system 108. When an open request 124 using this token 120 is received, the file system 108 checks the age of the token. If the system policy is one age for all requests to the file system 108, the file system uses the file name to determine the time of the original request 118 to the server 106 (i.e., the time the token 120 was created) and determines if that time is within the allowable range. If the system policy is that the server 106 determines how long to honor the request 124 to the file system 108, the file system uses the file name to determine the time of the original request 118 to the server 106 and determines if that time is within the range specified by the server. In either case, the time can be regenerated from the token 120 by inverting the encryption algorithm 304, using the file name as a decryption key.

Token Usage

File system 108 maintains for each directory a token list 116 containing valid tokens 120 and corresponding file names that have been received from the server 106. When a requestor 102 tries to open a file 110 using a token 120 as a file name, token list 116 is searched. If the token 120 is found, it is used to open the file 110.

Figure 4:
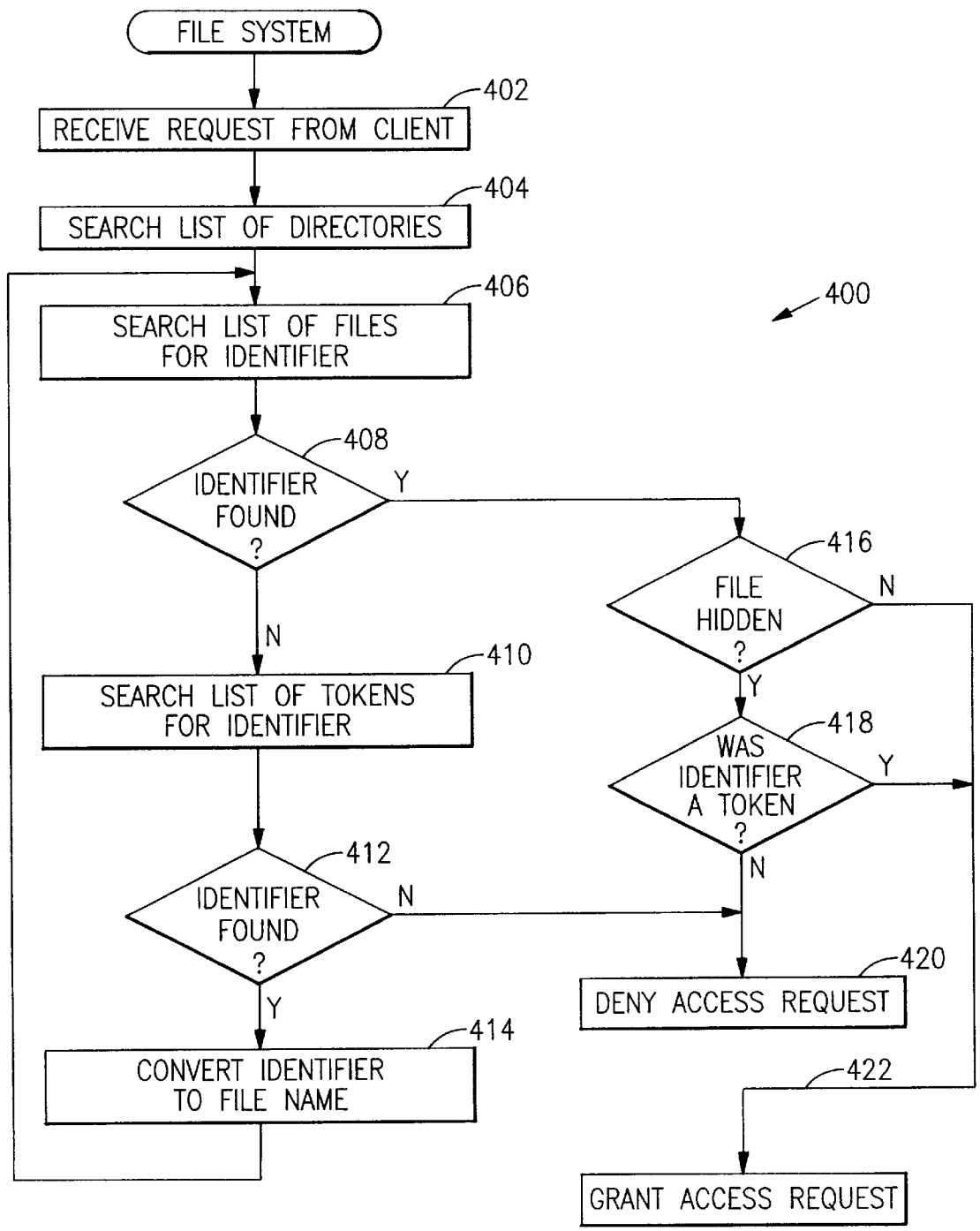
FIG. 4 is a flowchart of the token evaluation procedure followed by the distributed file system shown in FIG. 1.

FIG. 4 shows the general procedure 400 followed by the file system 108 for handling a request 124 for file access received from a client 102. As is usual for a file access request, the request 124 specifies the drive, the path (directory) and the file type (extension) of the file 110 being requested. However, instead of specifying the file name (and transparently to the client), the request 124 specifies the token 120 as the identifier.

Upon receiving the request 124 from the client 102 (step 402), the file system 108 first searches its directory list 112 for the drive and path specified in the request (step 404). Upon finding the indicated directory, the file system 108 searches the file list 114 for that directory for the identifier specified in the request 124 (step 406). If the identifier is not found (step 408), the file system 108 makes a similar search of the token list 116 for that directory for the identifier specified in the request 124; the file system also verifies that any token 120 found in the list is still valid (step 410). If the identifier is found and if the token 120 is still valid (step 412), the file system 108 converts the identifier to the corresponding file name (step 414) and returns to step 408 to again check the file list 114. Otherwise, the file system 108 denies access to the requested file 110 by returning a "file not found" response 126 to the requestor 102 (step 420).

If the identifier is found in the file list 114 on either the first or second iteration of step 408, the file system 108 checks to determine whether the file 110 has the extended attribute "hidden" (step 416). If not, this indicates that the file 110 being requested is not a protected file for which a token 120 should have been presented, and the file system grants access (step 422). On the other hand, if the file 110 does have the extended attribute "hidden" (step 416), this indicates that the file being requested is a protected file for which a token 120 should have been presented. If the original identifier was a token that was converted at step 414 (step 418), then the file system 108 grants access to the requested file 110 by returning a file handle to the client 102 as a response 126 (step 422). Otherwise, the file system 108 denies access by returning a "file not found" error code to the client 102 (step 420), since the required token 120 was not presented.

FIGS. 5–9 illustrate the flows between a client 102 and a file system 108 and within the file system 108 in various file access scenarios. In these figures the flows between client 102 and file system 108 are shown as passing through a LAN server 104' that is part of communications channel 104. In each case it is assumed that the client 102 has already obtained a token 120 from the object server 106 (not shown in FIGS. 5–9).

Figure 5:
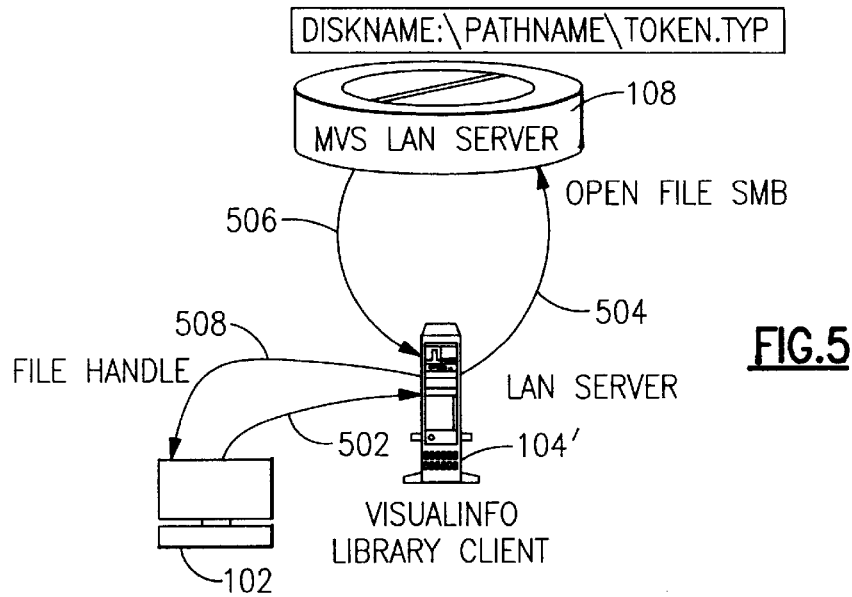
FIG. 5 is a schematic block diagram of the flows between the various system components in a first example, showing the successful use of a token.
Figure 6:
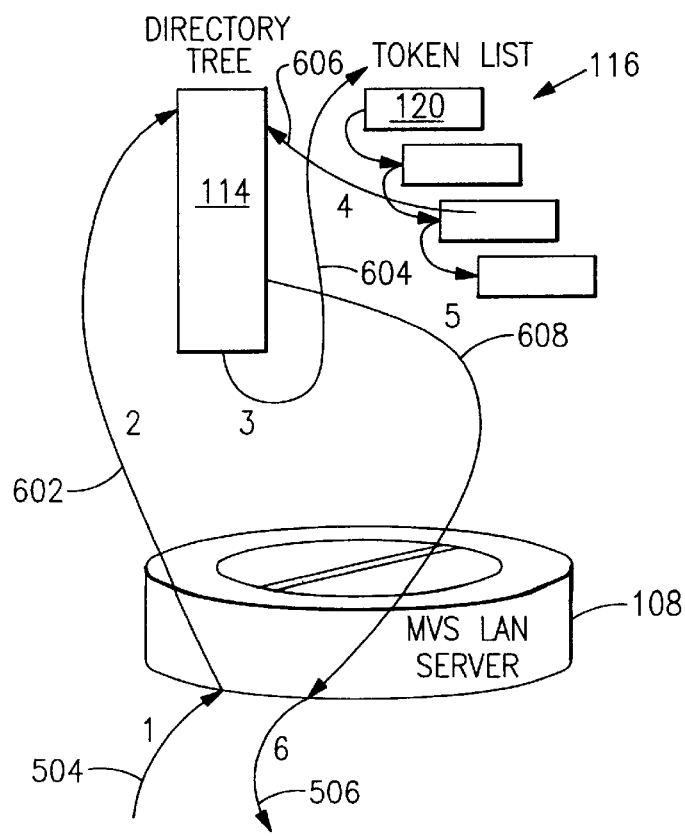
FIG. 6 is a schematic block diagram of the steps performed by the distributed file system in the example shown in FIG. 5.

FIG. 5–6 illustrate the flows when the client 102 successfully requests access to a file 110 stored in the file system 108. As shown in FIG. 5, the client 102 presents an access request to the LAN server 104' (502), which relays the request to the file system 108 (504). Upon successfully completing the request, the file system 108 returns a file handle to the LAN server 104' (506), which passes the handle back to the client 102 (508).

Referring now to FIG. 6, upon receiving the file access request from the LAN server 104' (504), file system 108 searches directory list 112 (FIG. 1) for the directory specified in the request. Upon finding the directory, the file system 108 searches the file list 114 for the identifier specified in the request (602). Since in this case the identifier is actually a token 120, it is not found. Since the identifier is not found in the file list 114, the file system 108 searches the corresponding token list 116 for the identifier (604). Upon finding the identifier in the token list 116, the file system 108 converts the identifier to the original file name and searches the file list 114 for the new file name (606). The file system 108 finds the indicated file 110 with the extended attribute "hidden", which is ignored because the identifier contained a token (608). Finally, the file system 108 grants the access request by providing LAN server 104' with a file handle (506), which is passed on to the client 102.

Figure 7:
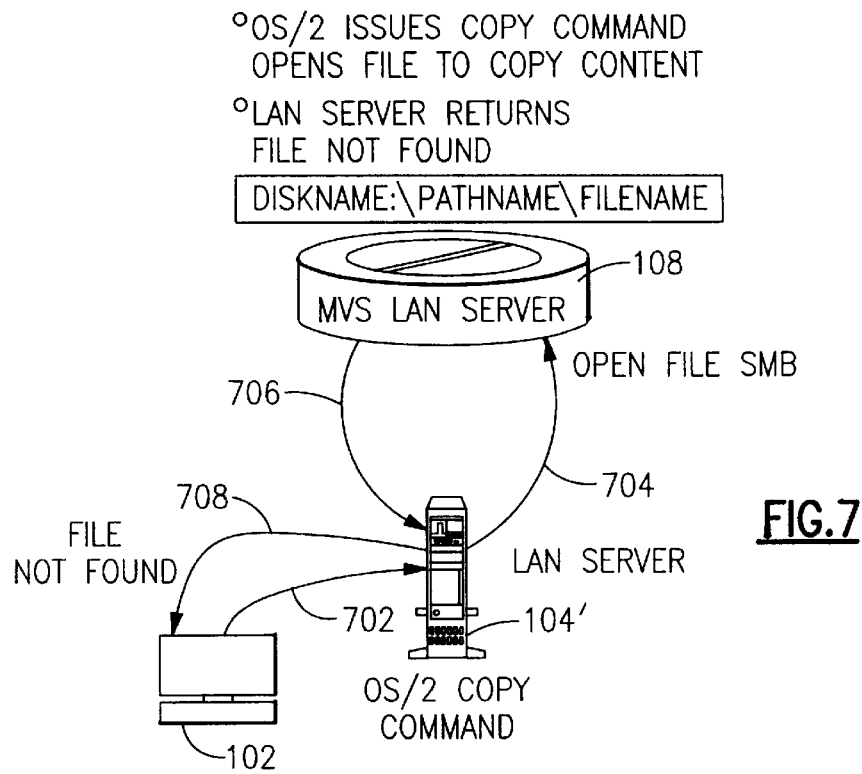
FIG. 7 is a schematic block diagram of the flows between the various system components in a second example, showing the unsuccessful use of a file name.
Figure 8:
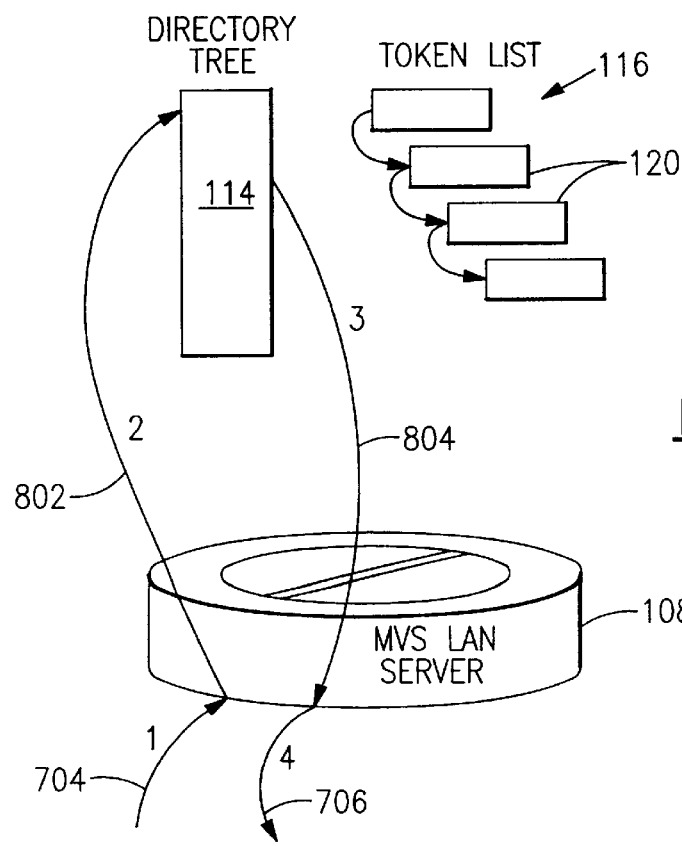
FIG. 8 is a schematic block diagram of the steps performed by the distributed file system in the example shown in FIG. 7.

FIGS. 7–8 illustrate the flows when the client 102 tries unsuccessfully to access a file 110 stored in the file system 108 which is protected in accordance with the present invention. In this example, an end user at the client workstation 102 knows the actual name of the file 110 stored in file system 108 and tries to copy the file to a workstation disk.

As shown in FIG. 7, in this example the client workstation 102 presents an access request to the LAN server 104' (702), which relays the request to the file system 108 (704). Upon unsuccessfully completing the request, the file system 108 returns a "file not found" indication to the LAN server 104' (706), which passes the indication back to the client 102 (708).

Referring to FIG. 8, upon receiving the request from the LAN server 104' (704), file system 108 searches the directory list 112 and file list 114 for the directory and identifier provided in the request (802). Since the identifier is found in the file list 114, the file 110 is hidden, and the file name was not created by searching the token list 116, the file system 108 converts the outcome to "file not found" (804). File system 108 provides LAN server 104' with a return code of "file not found" (706), which is passed back to the client 102.

Figure 9:
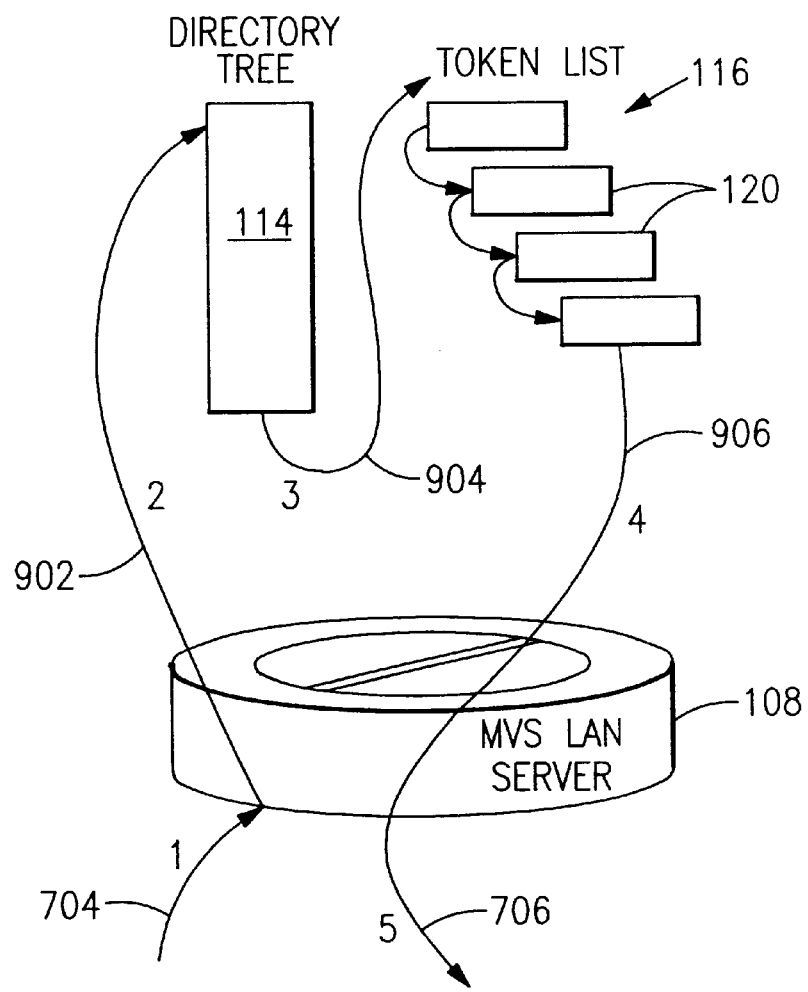
FIG. 9 is a schematic block diagram of the steps performed by the distributed file system in a third example, showing the unsuccessful use of a token.

FIG. 9 shows yet another example, in which an end user on client workstation 102 guesses incorrectly the name of a file 110 stored in the file system 108 and tries to access the file (e.g., to copy the file to a workstation disk). The overall flow between the system components is as shown in FIG. 7.

Referring to FIG. 9, upon receiving the file access request from LAN server 104' (704), file system 108 searches its directory list 112 and file list 114 for the directory and identifier provided in the request (902). Since the identifier is not found, the file system 108 then searches its token list 116 (904). Upon not finding the identifier in the token list 116, file system 108 provides server 104' with a return code of "file not found" (906), which is passed on to the client 102.

Although not shown in the above examples, preferably rejected requests should generate standard audit records for invalid access attempts, as is known in the art.

The invention is preferably implemented as software (i.e., a machine-readable program of instructions tangibly embodied on a program storage devices) executing on one or more hardware machines. While a particular embodiment has been shown and described, various modifications will be apparent to those skilled in the art.

What is claimed is:

1. In an information handling system having objects that are accessed by a requester, a method of controlling access to said objects, comprising the steps of:

storing a list of valid tokens;

receiving an access request from a requester, said request containing an identifier specifying a requested object;

comparing said identifier with said list of valid tokens to determine whether said identifier corresponds to a valid token from said list;

if said identifier corresponds to a valid token from said list, granting said requester access to said requested object; and if said identifier does not correspond to a valid token from said list, denying said requester access to said requested object.

2. The method of claim 1, comprising the further steps of:

storing a list of names of said objects;

comparing said identifier with said list of names of said objects to determine whether said identifier corresponds to a name of one of said objects; and if said identifier corresponds to a name of one of said objects, denying said requester access to said requested object.

3. In an information handling system in which a requester requests an identifier of an object being accessed and then requests access to said object using said identifier, a method of dynamically controlling access to said object, comprising the steps of:

in response to a request from a requester for an identifier of said object, dynamically generating a token and providing said token to said requester as said identifier of said object;

storing a list of tokens that have been previously generated; and in response to a request from a requestor for access to an object identified by an identifier, comparing said identifier with the tokens in said list and granting access to said object only if said identifier matches one of the tokens in said list.

4. The method of claim 3 in which said object has a name, said token being generated as a function of said name of said object.

5. The method of claim 4 in which said token is generated as a function of said name of said object and ephemeral information.

6. The method of claim 4 in which said access request is received at a predetermined time, said token being generated as a function of said name of said object and said predetermined time.

7. The method of claim 4 in which said token is generated as a cryptographic function of said name of said object and ephemeral information.

8. The method of claim 3 in which said generated token is added to said list of previously generated tokens.

9. The method of claim 3 in which each of said tokens has an indication of the time at which the token was generated, said comparing step including the step of checking said indication to determine whether said token is still valid.

10. In an information handling system having objects that are accessed by a requestor, apparatus for controlling access to said objects, comprising the steps of:

means for storing a list of valid tokens;

means for receiving an access request from a requester, said request containing an identifier specifying a requested object;

means for comparing said identifier with said list of valid tokens to determine whether said identifier corresponds to a valid token from said list;

means responsive to an identifier corresponding to a valid token from said list for granting said requester access to said requested object; and means responsive to an identifier not corresponding to a valid token from said list for denying said requestor access to said requested object.

11. In an information handling system in which a requestor requests an identifier of an object being accessed and then requests access to said object using said identifier, apparatus for dynamically controlling access to said object, comprising:

means responsive to a request from a requestor for an identifier of said object for dynamically generating a token and providing said token to said requester as said identifier of said object;

means for storing a list of tokens that have been generated by said token generating means; and means responsive to a request from a requester for access to an object identified by an identifier for comparing said identifier with the tokens in said list and for granting access to said object only if said identifier matches one of the tokens in said list.

12. A program storage device readable by a machine, tangibly embodying a program of instructions executable by the machine to perform method steps for controlling access to objects in an information handling system having objects that are accessed by a requester, said method steps comprising:

stored a list of valid tokens;

receiving an access request from a requestor, said request containing an identifier specifying a requested object;

comparing said identifier with said list of valid tokens to determine whether said identifier corresponds to a valid token from said list;

if said identifier corresponds to a valid token from said list, granting said requestor access to said requested object; and if said identifier does not correspond to a valid token from said list, denying said requestor access to said requested object.

13. A program storage device readable by a machine, tangibly embodying a program of instructions executable by the machine to perform method steps for dynamically controlling access to an object in an information handling system in which a requester requests an identifier of an object being accessed and then requests access to said object using said identifier, said method steps comprising:

in response to a request from a requester for an identifier of said object, dynamically generating a token and providing said token to said requester as said identifier of said object;

storing a list of tokens that have been previously generated; and in response to a request from a requester for access to an object identified by an identifier, comparing said identifier with the tokens in said list and granting access to said object only if said identifier matches one of the tokens in said list.

* * * * *